Sept. 22, 1964 W. V. FIELDER, JR 3,150,239

HANDSET HANGER

Filed Sept. 30, 1960 2 Sheets-Sheet 1

INVENTOR

William V. Fielder, Jr.

BY Robert T. Hillman

ATTORNEY

Sept. 22, 1964 W. V. FIELDER, JR 3,150,239

HANDSET HANGER

Filed Sept. 30, 1960 2 Sheets-Sheet 2

INVENTOR

William V. Fielder, Jr.

BY Robert T. Killman

ATTORNEY

3,150,239
HANDSET HANGER

William V. Fielder, Jr., Glen Arm, Md., assignor to The Bendix Corporation, a corporation of Delaware Filed Sept. 30, 1960, Ser. No. 59,571
11 Claims. (Cl. 179—146)

This invention relates to support brackets for telephone handsets or other devices and more particularly to a self-securing hanger for supporting a telephone handset or similar device in a suspended position from a vertical wall or other supporting member.

Telephone equipment has been provided in the past for supporting a conventional telephone handset in a cradle which is generally shaped to fit the outline of the receiver. While conventional arrangements of this type for supporting a handset when not in use are satisfactory for general home installations, many services require a more secure, convenient and compact support for the handset. In mobile service particularly a support for the handset is required which will store the instrument in a convenient location which is out of the way when not in use, and which securely holds the instrument against vibration and shock and acceleration forces which are transmitted to the handset bracket by virtue of the motion of the vehicle in which it is installed. It is thus necessary that the instrument be securely retained against dislodgment from intermittent large scale forces and at the same time firmly secured against vibration or chattering resulting from continuous intermittent forces or vibrations. In addition to these requirements it is, of course, necessary that the handset instrument be readily available for use with a minimum of effort in withdrawing the instrument from the supporting bracket and replacing the instrument therein when the use has been completed. It is particularly important in mobile applications, where the use of the instrument is quite extensive and becomes routine with the operator, that the return of the instrument to the support bracket be an operation which can be performed with a minimum amount of care and still achieve a secure retained position for the handset since the personnel using the handset may not take sufficient time properly to engage a handset with a hanger that requires extra manipulative acts.

It is an object of the present invention to provide improved handset hangers for a telephone handset or the like.

Another object of the invention is to provide a simple unitary handset hanger which securely retains a telephone handset without requiring any movable parts or spring biased retaining means.

A further object of the invention is to provide a handset hanger which will substantially and automatically seat a handset which is positioned only very approximately in the hanger and released to seat itself under the force of gravity.

Another object is to provide a handset hanger which in addition to securely holding the handset and readily seating the handset which is dropped into the hanger, provides ready removal of the handset without having to overcome any restraining forces.

These and other objects of the invention will be apparent from the following detailed description taken in conjunction with the accompanying drawings wherein:

FIGS. 1A through 5A are views similar to FIGS. 1 through 5 respectively of a modification.

The present invention provides a substantially rigid telephone handset hanger in the form of a plurality of converging surfaces so arranged that the upper portion of the hanger provides a relatively wide opening for receiving the receiver portion of the handset as it is placed therein with a generally downward movement and with the various surfaces converging so that when the handset reaches a position of rest the handset is contacted along the flat face of the receiver ear piece, at opposed points on the rear curved portion of the receiver housing, and at opposed points in contact with the handle of the handset substantially directly below the previously mentioned opposed points. The structure may be such that a single point of contact obtains upon the receiver ear piece or more than one point or an area of contact is established. The remaining four points of contact provide a converging clamping action which automatically becomes effective as the receiver moves in a slight downward arc which is characteristic of the motion involved in hanging a handset on a wall bracket.

Figure 2:
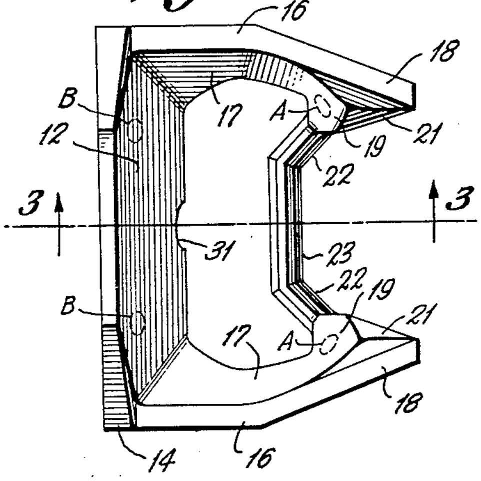
FIG. 2 is a top plan view of the handset hanger.
Figure 1:
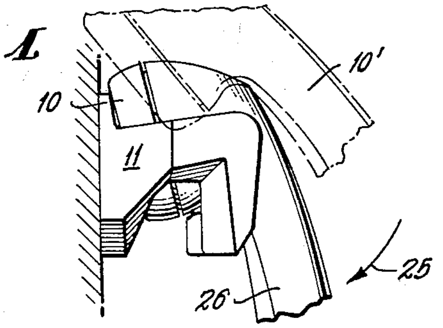
FIG. 1 is a side elevation view of one form of handset hanger supporting one form of handset on a vertical wall.
Figure 3:
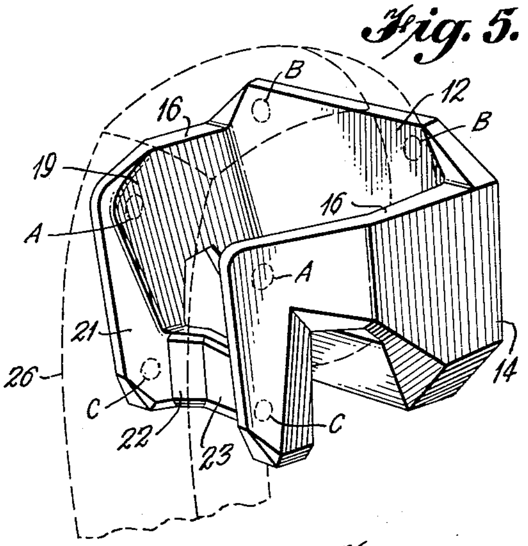
FIG. 3 is an elevation sectional view of the handset hanger of FIG. 2 taken along the line 3—3.
Figure 4:
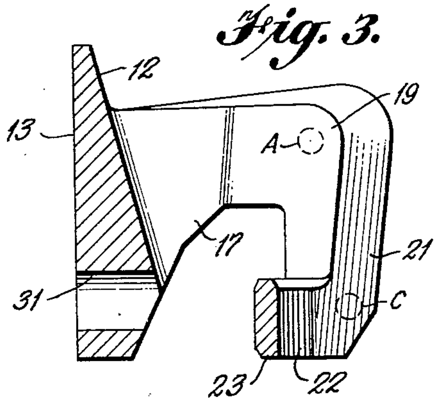
FIG. 4 is an end elevation view of the hanger shown in FIG. 2.

Referring now to FIGS. 1 through 5, one form of the hanger in accordance with the invention will be described. In FIG. 1 is shown a handset 10 hanging in a bracket 11 to support the handset 10 in a substantially vertical position. As best seen in FIG. 3 the bracket 11 comprises a face plate 12 which slopes away from a back face 13 in the downward direction. Extending from a body portion 14 are a pair of concave shaped opposed members 16 having interior surfaces 17 which converge in the downward direction. The arms 16 terminate in converging lobes 18 which have interior surfaces 19 which converge downwardly with the face plate 12 as well as with each other. The surfaces 19, 17 and 12 may be smoothly joined and the surfaces 17, 19 formed as a continuous surface with smooth transitions therebetween. The lobes 18 continue in a downward direction to provide an opening between edges 21, the upper portion of the edges 21 being the termination of the surfaces 19. The lower portion of the edges 21 join surfaces 22 which converge laterally to a cross-member 23 which strengthens the projecting arms 16.

The face plate 12 of the bracket may be arranged to make plane area contact with the plane of a circle on the receiver ear piece. As the receiver 10 is placed into the bracket the normal procedure is to position the receiver 10 in a position indicated at 10' in FIG. 1 whereupon the release of the receiver allowing the same to fall under the influence of gravity would result in a generally swinging motion as indicated by the arrow 25, accompanied by a falling motion as the receiver 10 settled into the position shown. In this position the receiver ear piece makes contact with the bracket face plate 12 as previously stated, and is urged in contact therewith by the force exerted by contacts with the rear portion of the receiver housing at the point of engagement with the surfaces 19. The point of engagement with the surfaces 19 tends to wedge the handset 10 into a snug fit relative to transverse forces by virtue of the downward convergence of surfaces 19 toward one another as well as toward the face plate 12. The rest position of the receiver 10 also corresponds with the position of contact by the interior surfaces 21 with handle portion 26 of the handset 10. This contact with the handle 26 provided by the surfaces of 21 stabilizes the receiver 10 with respect to a swinging motion which would be possible with respect to the contacts with the receiver housing made by surfaces 19 and a rotary motion of the plane circle contact at the surface 12.

The weight of the transmitter portion of the handset depending from the handle 26 supplies sufficient force to retain the handle 26 in contact with the surfaces 21 and cooperates with the contact made by surfaces 19 and 12 to stabilize the receiver 10 with respect to all motions except for a rotary motion opposite to that indicated by the arrow 25. This opposite rotary motion corresponds to the normal action of placing the hand on the handle 26 and lifting the handset for normal use and in this operation the handset 10 comes free of the bracket 11 with substantially no resistance whatever. It is to be noted that due to the inward restraining influence of the surfaces 19 a mere translational force away from the surface on which the mounting surface 13 is secured will not dislodge the handset since a mere horizontal force is opposed by the combination of contacts and the effective couple which they apply to the receiver 10, in the absence of a lifting force relieving the force components due to the downward weight of the handset. A lifting and turning force however such as results from the application of the hand to the receiver for lifting it for normal use simultaneously tends to relieve all of the action of the converging surface pairs 21, 19 and 12 while sliding the receiver housing 10 upward in the direction of the sloping surface 12 to relieve the pressure resulting from the contact between the surfaces 19 and surface 12.

As previously mentioned, the converging surfaces of handset hanger provide points of contact for the portions of the handset placed thereon which are effective securely to hold the handset without spring action of any kind. These points of contact are designated in the various figures as points B—B on the surface 12, points A—A on the surfaces 19, and points C—C on the surfaces 21. The exact location of these points on their respective surfaces will be the point of contact between the surface and the appropriate portion of the handset as determined by the exact physical dimensions of the handset. In particular although the points B—B lie on a plane surface 12, due to the shape of the ear piece of an ordinary handset only two points of contact with the surface 12 will ordinarily obtain.

The handset as described may be provided with an aperture 31 through the portion of the handset which forms the surface 12 for the purpose of mounting an on-off switch of the telephone equipment with which the handset is used. The aperture 31 provides a conventional arrangement whereby the placing of the handset in the hanger automatically deflects the switch operator to turn off the equipment.

Figure 5:
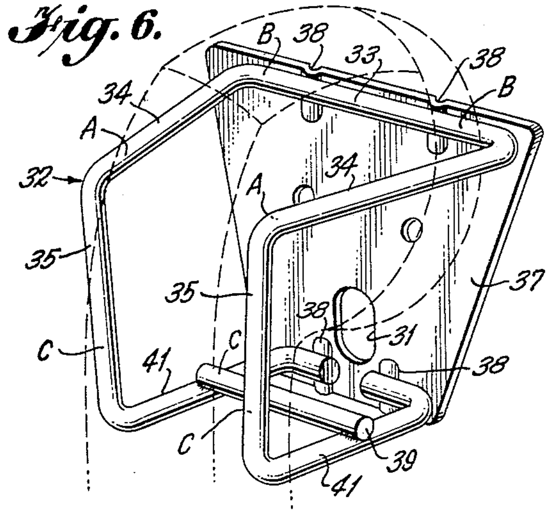
FIG. 5 is a perspective view of the hanger with a handset shown in phantom view in the secured position.
Figure 6:
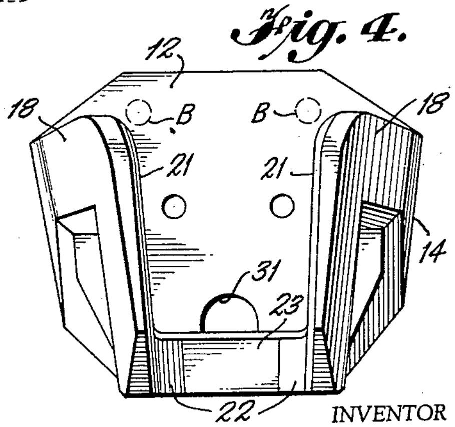
FIG. 6 is a perspective view of a modified form of hanger with a handset shown in phantom.

Referring now to FIG. 6 an alternative embodiment of the invention is shown in which the properties described for the embodiment illustrated in FIGS. 1 through 5 are obtained from a properly formed steel rod 32. As shown in FIG. 6 the rod 32 provides a horizontal portion 33 which provides the contacts B—B. The portion 33 has extensions 34 which converge in a horizontal plane to provide the contacts A—A. The extensions 34 are continued in downward extensions 35 which converge in vertical plane to supply the contacts C—C. The bracket formed by the rod 32 in FIG. 6 is secured to a mounting plate 37 by any suitable arrangement such as weld connections at the points 38. To reinforce the bracket and prevent spring action a metal rod 39 may be secured to the support extensions 41 thereby providing dimensional stability between the contact points C—C when the receiver is placed in the bracket.

The handset hangers described in FIGS. 1–6 are formed to accommodate a particular shape handset as illustrated in phantom in FIGS. 5 and 6. The actual shape of the bracket illustrated, however, may be modified to accommodate the bell shape type of handset 10 illustrated in FIG. 1.

An improved modification of the handset of the present invention is shown in FIGS. 1A through 5A which correspond respectively to the views shown and described in FIGS. 1 through 5. The modification shown in FIGS. 1A through 5A corresponds in general with the description previously given with the addition on the interior surfaces 19 of projecting tabs 42. The projection provided by the tabs 42 adapts this embodiment to accommodate both types of handset illustrated in FIGS. 1 and 5 for example. With this arrangement the tabs 42 provide the contact points A'—A' on surfaces 19 for the bell shaped handset (FIG. 1A) while for the other type handset (FIG. 5A) the points A—A provide the corresponding contact with the handset. Further modifications in shape include shoulders 43 on the surface 12 to provide contacts B—B and the ledges 44 which support the under surface of handle 26. The ledges 44 slope inwardly toward surface 12 and also with respect to surfaces 21 (i.e. ledges 44 are not perpendicular to surfaces 21) to provide a shallow V-bottom trough in which the handle 26 is cradled between contacts C—C. This bottoming of the handle 26 on the ledges 44 is distinct from the modification of FIGS. 1–5 since in FIGS. 1–5 no contacts is made between the handle 26 and the surfaces 23, 23. In all other respects the improved handset shown in FIGS. 1A–5A is similar and the description corresponds with that previously set forth and corresponding reference numerals are employed. The interior surfaces 17' are indicated as generally rounded in shape to provide the clearance necessary to avoid contact with the bell shaped handset illustrated in FIG. 1A.

Figures 1A, 2A, 3A, 4A, 5A:
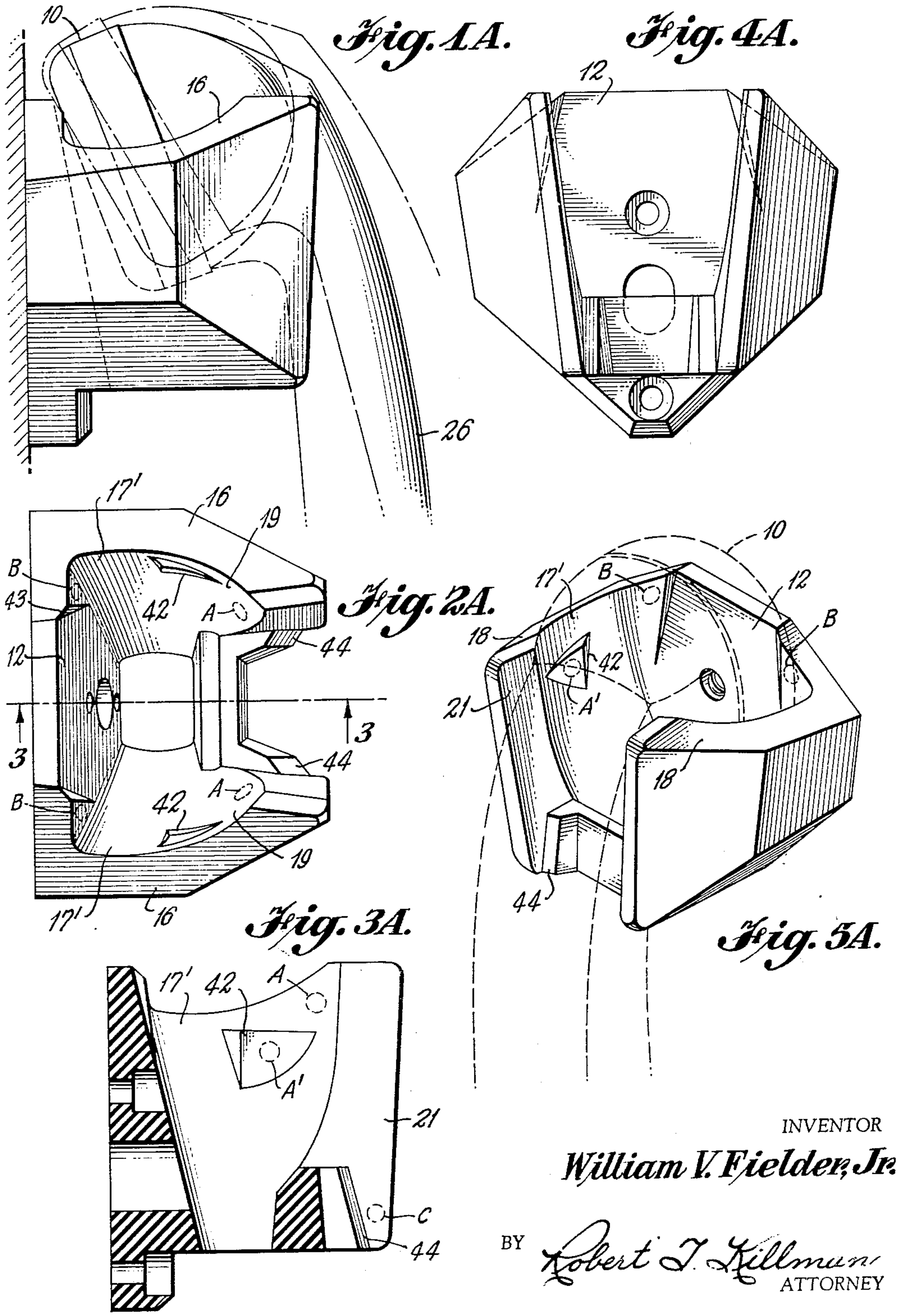

A further improvement in the handset hangers of the present invention is indicated in FIG. 3A where the structure is illustrated in sectional view as being constructed of molded rubber or similar material. The molded rubber construction of the device provides a substantially rigid overall shape while permitting minute local deformation of the rubbery surface at the pressure contact points thereby providing a more secure grip on the handset than would be the case in a construction employing molded metal or other hard rigid material. The rubber surface contact also supplies a high degree of friction to increase the retaining force applied to the handset at the contact points. This operation providing improved contact is distinct, however, from the prior art handset hangers which rely upon yieldable spring members which require a noticeable deflection force when the handset is inserted.

While various embodiments of the invention have been illustrated and described, it will be apparent that many modifications may be made in the light of the present teachings without departing from the scope of the invention which is defined by the appended claims.

I claim:

1. A substantially rigid telephone handset hanger comprising a body having a generally conical downwardly converging opening therein, said body being formed by an earpiece contacting surface, and at least a pair of projections extending from said surface to define said opening, said projections being spaced apart to form a handle receiving slot opposed to said surface, the spacing of said projections and the amount by which said projections extend from said surface being proportioned to provide contact at six points with a telephone handset placed in said hanger, two of said points being contacts between opposite surfaces of the handle of said handset and opposed edges of said slot to restrain said handset from motion in any direction except upward motion.

2. A hanger for removably holding a handset which has spaced transmitter and receiver housings each having an operating faceplace and connected by a handle comprising a wall bracket defining a flat contact surface, a pair of projections secured to said bracket with a spacing therebetween greater than the dimension of said faceplace and converging to form a slot at the ends of said projections remote from said bracket, and downward projections from said ends which converge downwardly to define spaced contact points for contacting opposite surfaces of said handle.

3. A telephone handset hanger comprising a substantially rigid body casting formed to provide a generally conical downwardly converging opening therein defined by a first wall of said casting having a flat vertical outer surface and an inclined inner surface and a pair of projecting walls secured to said first wall and having opposed inner surfaces which are concave in both vertical and horizontal sections, said pair of walls terminating in spaced vertically elongated surfaces which converge downwardly and inwardly to form an approximately vertical cradle for the depending handle of a telephone handset.

4. Apparatus according to claim 3 in which said concave inner surfaces are formed with opposed projections to adapt said handset hanger to receive different size handsets.

5. Apparatus according to claim 3 in which said body is molded of soft rubber-like material to provide a substantially rigid shape capable of local deformation at the points of contact with a handset.

6. Apparatus according to claim 5 in which said rubber-like material provides a high coefficient of friction at said points of contact with a telephone handset.

7. Apparatus according to claim 6 in which said concave inner surfaces are formed with opposed projections to adapt said handset hanger to receive different size handsets.

8. Apparatus according to claim 3 in which said body has a surface which provides a high coefficient of friction at said points of contact with a telephone handset.

9. A hanger for removably holding a handset which has a bulbous housing with a depending handle comprising a molded body formed to provide a socket to receive said housing having four points of contact with said housing, said points being approximately in a horizontal plane at approximately diametrically opposed positions, a pair of spaced depending projections on said body extending beneath an adjacent pair of said points to form an open-bottomed vertical trough the side walls of which provide a pair of contact points on opposite sides of said handle a substantial distance below said adjacent pair of points.

10. A hanger according to claim 9 in which said body is molded of soft rubber-like material to provide a substantially rigid shape capable of local deformation at the points of contact with said handset.

11. Apparatus according to claim 9 in which said body has a surface which provides a high coefficient of friction at said points of contact with a handset.

References Cited in the file of this patent

UNITED STATES PATENTS

| | | |
|---|---|---|
| 2,036,010 | Atkins | Mar. 31, 1936 |
| 2,339,413 | King | Jan. 18, 1944 |
| 2,443,329 | Sears | June 15, 1948 |
| 2,579,878 | Stone | Dec. 25, 1951 |
| 2,987,585 | Abysalh | June 6, 1961 |